(12) United States Patent
Buiel et al.

(10) Patent No.: US 8,023,251 B2
(45) Date of Patent: Sep. 20, 2011

(54) HYBRID ENERGY STORAGE DEVICE AND METHOD OF MAKING SAME

(75) Inventors: Edward Buiel, New Castle, PA (US); Victor Eshkenazi, Vaughan, CA (US); Leonid Rabinovich, Thornhill, CA (US); Wei Sun, New Castle, PA (US); Vladimir Vichnyakov, Newmarket, CA (US); Adam Swiecki, Milton, CA (US); Joseph Cole, New Castle, PA (US)

(73) Assignee: Axion Power International, Inc., New Castle, PA (US)

( * ) Notice: Subject to any disclaimer, the term of this patent is extended or adjusted under 35 U.S.C. 154(b) by 399 days.

(21) Appl. No.: 12/446,633

(22) PCT Filed: Oct. 22, 2007

(86) PCT No.: PCT/US2007/082065
§ 371 (c)(1),
(2), (4) Date: Apr. 22, 2009

(87) PCT Pub. No.: WO2008/051896
PCT Pub. Date: May 2, 2008

(65) Prior Publication Data
US 2010/0091430 A1    Apr. 15, 2010

Related U.S. Application Data

(60) Provisional application No. 60/853,439, filed on Oct. 23, 2006.

(51) Int. Cl.
*H01G 9/048* (2006.01)
*H01G 9/042* (2006.01)
*H01G 9/04* (2006.01)
*H01G 9/08* (2006.01)

(52) U.S. Cl. ........ 361/533; 361/531; 361/502; 361/503; 429/9; 429/225; 429/209; 429/211; 429/128; 429/149; 429/161; 429/208

(58) Field of Classification Search .......... 361/500–541; 428/607; 29/25.03; 439/627, 504; 429/9, 429/225, 209, 211, 128, 161, 208, 149
See application file for complete search history.

(56) References Cited

U.S. PATENT DOCUMENTS 1,594,810 A    8/1926    Benner et al.
(Continued)

FOREIGN PATENT DOCUMENTS

JP    55056365 A  *  4/1980
(Continued)

OTHER PUBLICATIONS

English Abstract of JP2004355823, Dec. 16, 2004.
(Continued)

*Primary Examiner* — Anatoly Vortman
(74) *Attorney, Agent, or Firm* — Cahn & Samuels, LLP

(57) ABSTRACT

A hybrid energy storage device includes at least one cell comprising at least one positive electrode, at least one negative electrode, a separator placed between said at least one positive and said at least one negative electrode, and an electrolyte. The at least one positive electrode comprises an active material comprising lead and a tab extending from a side of the at least one positive electrode. The at least one negative electrode comprises an activated carbon material, a tab extending from a side of the at least one negative electrode, and a lead lug encapsulating said tab. A first cast-on lead strap is on the tab extending from said at least one positive electrode. A second cast-on lead strap is on the lead lug of the at least one negative electrode.

23 Claims, 5 Drawing Sheets

U.S. PATENT DOCUMENTS

| | | | |
|---|---|---|---|
| 3,242,402 A * | 3/1966 | Stahr et al. | 361/318 |
| 3,275,473 A | 9/1966 | Barnett et al. | |
| 3,306,779 A | 2/1967 | Flannery et al. | |
| 3,327,184 A * | 6/1967 | Valley | 361/309 |
| 3,333,169 A * | 7/1967 | Valley | 361/313 |
| 3,352,718 A | 11/1967 | Carson, Jr. et al. | |
| 3,404,061 A | 10/1968 | Bochman et al. | |
| 3,434,883 A | 3/1969 | Cretella et al. | |
| 3,457,112 A | 7/1969 | Reber | |
| 3,540,926 A * | 11/1970 | Rairden | 427/567 |
| 3,692,587 A | 9/1972 | Faust et al. | |
| 3,856,574 A | 12/1974 | Amagi et al. | |
| 3,859,134 A * | 1/1975 | Shirodker | 429/211 |
| 3,926,764 A | 12/1975 | Ruzicka et al. | |
| 4,014,730 A | 3/1977 | Selover, Jr. et al. | |
| 4,265,952 A | 5/1981 | Caines | |
| 4,438,481 A | 3/1984 | Phillips et al. | |
| 4,725,927 A | 2/1988 | Morimoto et al. | |
| 4,862,328 A | 8/1989 | Morimoto et al. | |
| 5,006,426 A | 4/1991 | Suzuki et al. | |
| 5,149,605 A * | 9/1992 | Dougherty | 429/160 |
| 5,162,172 A | 11/1992 | Kaun | |
| 5,352,545 A * | 10/1994 | Furukawa et al. | 429/57 |
| 5,476,734 A | 12/1995 | Pulley et al. | |
| 5,494,763 A | 2/1996 | Behl et al. | |
| 5,576,928 A * | 11/1996 | Summerfelt et al. | 361/321.1 |
| 5,581,438 A | 12/1996 | Halliop | |
| 5,711,988 A | 1/1998 | Tsai et al. | |
| 5,744,258 A | 4/1998 | Bai et al. | |
| RE36,102 E * | 2/1999 | Dougherty | 429/160 |
| 6,021,039 A | 2/2000 | Inagawa et al. | |
| 6,195,252 B1 | 2/2001 | Belyakov et al. | |
| 6,222,723 B1 | 4/2001 | Razoumov et al. | |
| 6,316,148 B1 * | 11/2001 | Timmons et al. | 429/241 |
| 6,335,858 B1 | 1/2002 | Vasechkin et al. | |
| 6,426,862 B1 | 7/2002 | Vasechkin et al. | |
| 6,466,429 B1 * | 10/2002 | Volfkovich et al. | 361/502 |
| 6,519,137 B1 * | 2/2003 | Nitta et al. | 361/525 |
| 6,531,240 B1 | 3/2003 | Brown et al. | |
| 6,628,504 B2 | 9/2003 | Volfkovich et al. | |
| 6,643,119 B2 | 11/2003 | Nanjundiah et al. | |
| 6,706,079 B1 | 3/2004 | Shmatko et al. | |
| 6,946,007 B2 | 9/2005 | Bendale et al. | |
| 7,006,346 B2 | 2/2006 | Volfkovich et al. | |
| 7,006,348 B1 * | 2/2006 | Ueda et al. | 361/530 |
| 7,110,242 B2 | 9/2006 | Adrianov et al. | |
| 7,119,047 B1 | 10/2006 | Adrianov et al. | |
| 7,312,976 B2 | 12/2007 | Kazaryan et al. | |
| 7,443,650 B2 | 10/2008 | Nedoshivin et al. | |
| 2001/0003024 A1 | 6/2001 | Nemoto | |
| 2002/0028389 A1 | 3/2002 | Sonoda et al. | |
| 2002/0080553 A1 * | 6/2002 | Pekala | 361/302 |
| 2003/0086238 A1 | 5/2003 | Bendale | |
| 2003/0110607 A1 | 6/2003 | Bendale et al. | |
| 2004/0005502 A1 | 1/2004 | Schlag | |
| 2004/0240155 A1 * | 12/2004 | Miltich et al. | 361/512 |
| 2005/0002150 A1 | 1/2005 | Volfkovich et al. | |
| 2006/0073345 A1 | 4/2006 | Naruse | |
| 2006/0292384 A1 | 12/2006 | Kazaryan et al. | |
| 2007/0003833 A1 | 1/2007 | Li et al. | |
| 2007/0104981 A1 | 5/2007 | Lam et al. | |
| 2007/0128472 A1 | 6/2007 | Tierney et al. | |
| 2008/0100990 A1 | 5/2008 | Buiel et al. | |
| 2008/0113268 A1 | 5/2008 | Buiel et al. | |
| 2008/0130202 A1 * | 6/2008 | Ro et al. | 361/516 |
| 2008/0131763 A1 | 6/2008 | Buiel et al. | |
| 2008/0229565 A1 * | 9/2008 | Schott et al. | 29/25.03 |
| 2009/0035657 A1 * | 2/2009 | Buiel et al. | 429/211 |
| 2009/0103242 A1 | 4/2009 | Buiel et al. | |
| 2010/0040950 A1 | 2/2010 | Buiel et al. | |
| 2010/0097743 A1 * | 4/2010 | Yoshida et al. | 361/504 |
| 2011/0159375 A1 * | 6/2011 | Feaver et al. | 429/302 |

FOREIGN PATENT DOCUMENTS

| | | | |
|---|---|---|---|
| JP | 58001967 A * | 1/1983 | |
| JP | 59027452 A * | 2/1984 | |
| JP | 59081865 A * | 5/1984 | |
| JP | 07235454 A | 9/1995 | |
| JP | 2003/126863 A | 5/2003 | |
| JP | 2004/355823 A | 12/2004 | |

OTHER PUBLICATIONS

Abstract of JP 2004/355823, Yoshinari, et al., Dec. 2004.

Machine translation of JP 2004/355823, Yoshinari, et al., Dec. 2004.

* cited by examiner

HYBRID ENERGY STORAGE DEVICE AND METHOD OF MAKING SAME

This is a U.S. national stage application of PCT international application PCT/US2007/082065 filed on 22 Oct. 2007 and claims priority of U.S. provisional application Ser. No. 60/853,439 filed on 23 Oct. 2006, the entireties of which are incorporated herein by reference.

I. TECHNICAL FIELD

The present invention is directed to a hybrid energy storage device. The hybrid energy storage device comprises at least one cell comprising at least one lead-based positive electrode, at least one carbon-based negative electrode, a separator between adjacent positive and negative electrodes, and an electrolyte.

II. BACKGROUND OF INVENTION

Hybrid energy storage devices, also known as asymmetric supercapacitors or hybrid battery/supercapacitors, combine battery electrodes and supercapacitor electrodes to produce devices having a unique set of characteristics including cycle life, power density, energy capacity, fast recharge capability, and a wide range of temperature operability. Hybrid lead-carbon energy storage devices employ lead-acid battery positive electrodes and supercapacitor negative electrodes. See, for example, U.S. Pat. Nos. 6,466,429; 6,628,504; 6,706,079; 7,006,346; and 7,110,242.

The conventional wisdom is that any new battery or supercapacitor technology assembles components and uses techniques that are unique to that technology. Moreover, the conventional wisdom is that lead-carbon energy storage devices are required to be assembled using relatively high compression of the cell or cells within the device. The high compression is due in part to the large contact resistance existing between an activated carbon active material and a current collector of a negative electrode. It is also conventional wisdom that equipment generally used to manufacture conventional lead-acid batteries and commonly employed in the automotive industry, motive power, stationary, and other energy storage applications cannot be employed in the production of hybrid energy storage devices.

It is a purpose of the present invention to provide hybrid energy storage devices having excellent cycle life and which are capable of being manufactured using available conventional lead-acid battery manufacturing equipment. The inventors have proven that single and multi-cell hybrid energy storage devices may be manufactured using conventional lead acid-battery manufacturing equipment with modifications owing to the design of the negative electrode that eliminates the need for large amounts of stack pressure to be applied to cells within the device.

Thus, contrary to conventional wisdom for hybrid energy storage devices, a high compression is not required in the assembly of a hybrid storage device according to the present invention. It is unnecessary to provide an additional mechanism to compress individual cells, and the hybrid energy storage devices can be assembled with commercially available cases and covers. Otherwise, new custom hardware and assembly equipment is required, leading to significant cost increases and/or significant process changes.

III. SUMMARY OF INVENTION

It is an object of the present invention to provide a hybrid energy storage device having an excellent cycle life.

It is another object of the present invention to provide hybrid energy storage devices that are capable of being manufactured using conventional lead-acid battery manufacturing equipment.

It is an advantage of the present invention that compression of at least one cell of a hybrid energy storage device reduces problems such as cell damage due to vibration.

It is a further advantage of the present invention that compression of less than about 5 psi is needed in the assembly of a hybrid energy storage device.

The above objects and advantages are satisfied by a hybrid energy storage device comprising at least one cell comprising at least one positive electrode, at least one negative electrode, a separator placed between the at least one positive and the at least one negative electrode, and an electrolyte. The at least one positive electrode comprises an active material comprising lead and has a tab extending from a side of the positive electrode. The at least one negative electrode comprises an activated carbon material and has a tab extending from a side of the negative electrode with a lead lug encapsulating the tab. A first cast-on lead strap is cast on the tab of the at least one positive electrode. A second cast-on lead strap is cast on the lead lug of the at least one negative electrode.

As used herein "substantially", "generally", "relatively", "approximately", and "about" are relative modifiers intended to indicate permissible variation from the characteristic so modified. It is not intended to be limited to the absolute value or characteristic which it modifies but rather approaching or approximating such a physical or functional characteristic.

References to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

In the following description, reference is made to the accompanying drawings, which are shown by way of illustration to specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

IV. BRIEF DESCRIPTION OF DRAWINGS

V. DETAILED DESCRIPTION OF INVENTION

FIGS. 1-5 illustrate a hybrid energy storage device and the components thereof. According to the present invention, the hybrid energy storage device comprises at least one cell comprising at least one lead-based positive electrode, at least one carbon-based negative electrode, a separator between adjacent positive and negative electrodes, and an electrolyte. The lead-based positive electrode and the carbon-based negative electrode each have a tab extending from a side of the electrode. A cast-on strap connects each tab of a given polarity, resulting in a single connection of all tabs with common polarity within the at least one cell. For example, one cast-on strap may connect all of the positive electrodes within a given cell, and one cast-on strap may connect all of the negative electrodes within a given cell.

A. Negative Electrode

Figure 1:
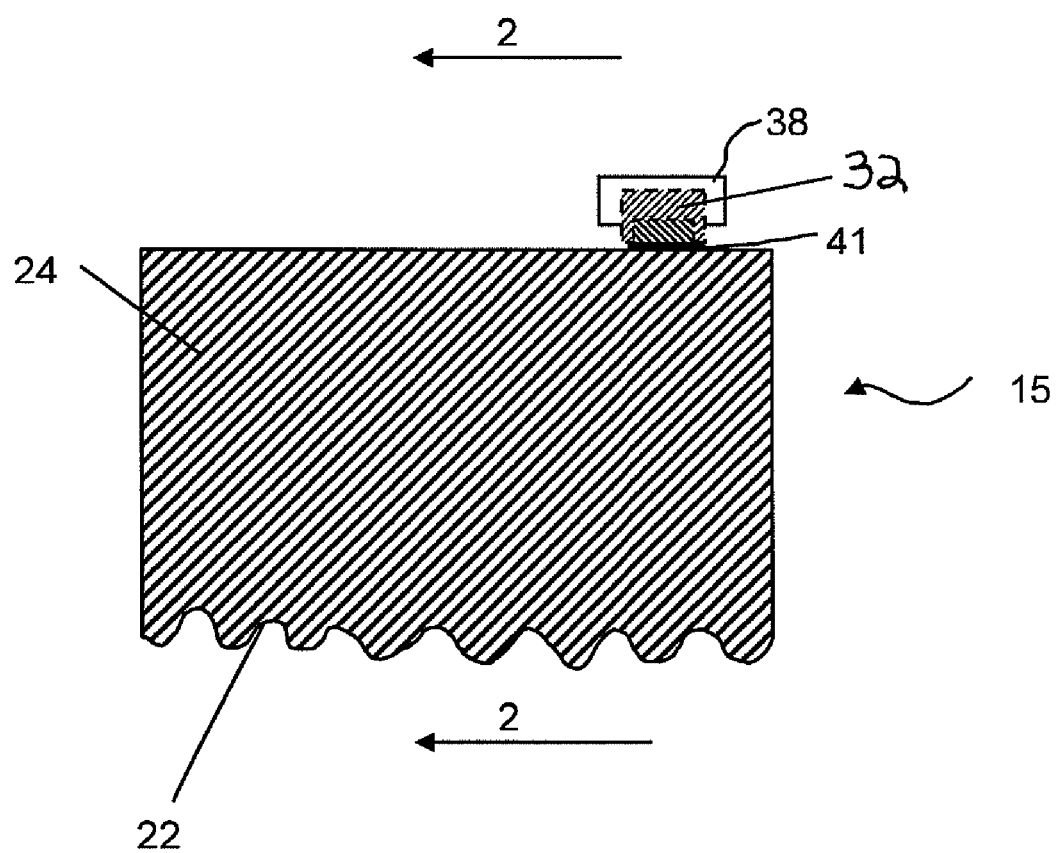
FIG. 1 is a partial schematic view of a negative electrode having a cast-on strap according to an embodiment of the present invention.
Figure 2:
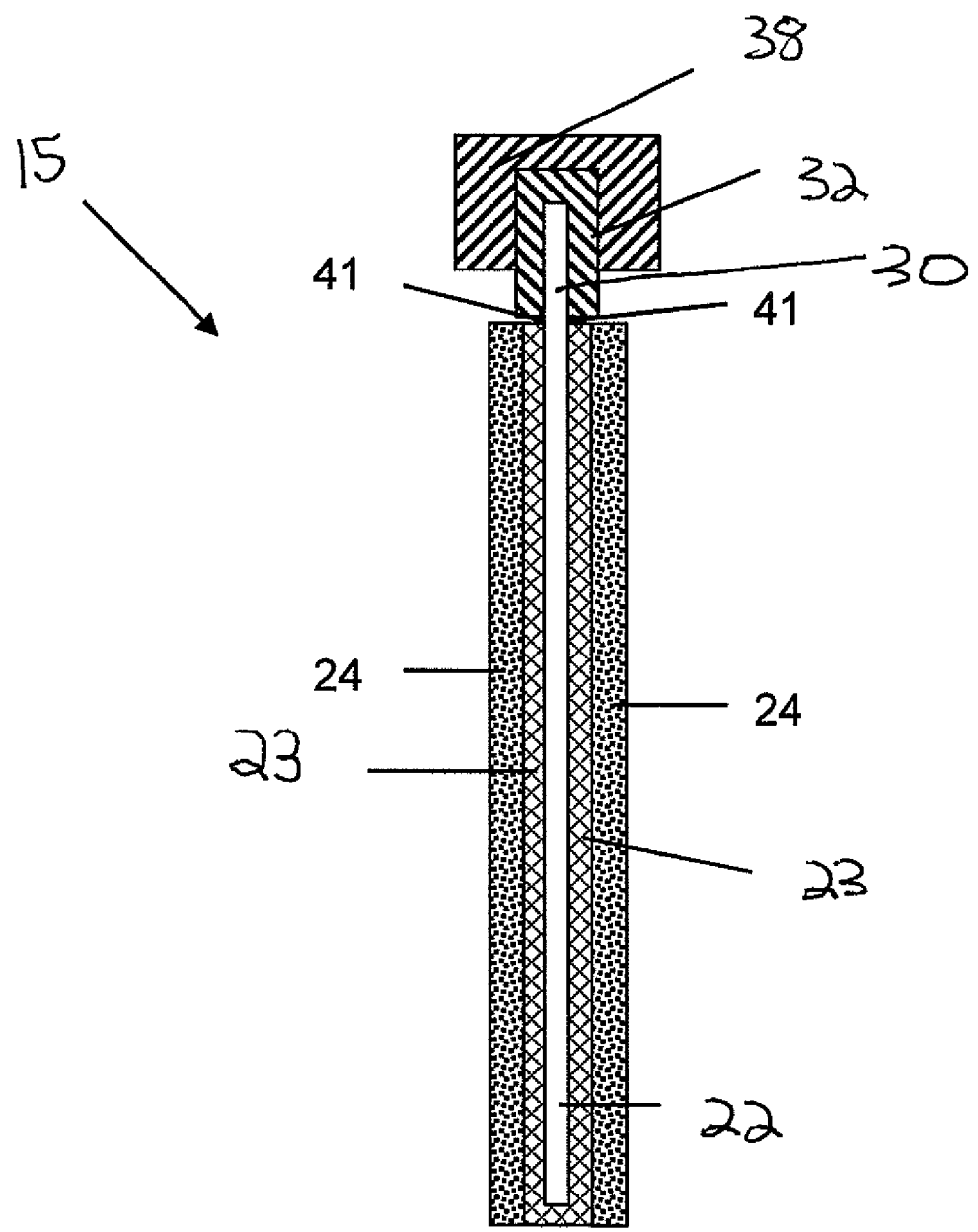
FIG. 2 is a cross-section of the negative electrode of FIG. 1.

FIG. 1 and FIG. 2 illustrate at least one negative electrode 15 comprising a current collector 22; a corrosion-resistant coating 23 adhered to at least one face of the current collector 22; and an active material 24 adhered to the corrosion-resistant coating 23. The at least one negative electrode 15 also comprises a tab 30 that extends from a side of the electrode, for example, above a top edge of the at least one negative electrode 15, (e.g., extending above current collector 22).

The current collector 22 comprises a conductive material. For example, the current collector 22 may comprise at least one metallic material such as beryllium, bronze, leaded commercial bronze, copper, copper alloy, silver, gold, titanium, aluminum, aluminum alloys, iron, steel, magnesium, stainless steel, nickel, mixtures thereof, or alloys thereof. The current collector may comprise any conductive material that has a conductivity greater than $1 \times 10^5$ siemens/m. In preferred embodiments, the current collector comprises copper or a copper alloy.

The corrosion-resistant coating 23 preferably comprises an impregnated graphite material. The graphite is impregnated with a substance to make the expanded graphite sheet or foil acid-resistant. The substance may be a non-polymeric substance such as paraffin or furfural. Preferably, the graphite is impregnated with paraffin and rosin. In embodiments, the graphite may be impregnated with a mixture of about 90 to about 99 wt. % paraffin and about 1 to about 10 wt. % rosin, preferably about 2 to about 5 wt. % rosin, based upon the weight of the mixture. Rosin helps the pores in the graphite to be completely sealed and thus not permeable by acid. In embodiments, the impregnating substance exhibits thermoplastic properties and may have a melting temperature in the range of about 25° C. to about 400° C. The graphite may be in the form of a sheet or foil made from high density or low-density expanded graphite particles. Preferably, the corrosion-resistant coating comprises a low-density expanded graphite.

In other embodiments, the corrosion-resistant coating may comprise a polymer coating comprising a conductive material such as carbon black. Alternatively, the corrosion-resistant coating may comprise a conductive but corrosion-resistant material, such as titanium sub-oxide (e.g., $Ti_xO_{2x-1}$ where x is an integer) or a conductive diamond material. In embodiments, the conductive diamond material may be a layer or film deposited by a hot filament chemical vapor deposition (CVD) method, microwave plasma CVD method, plasma arc jet method, or plasma vapor deposition (PVD) method. The conductive diamond may be doped, for example, with boron.

The active material 24 of the negative electrode comprises activated carbon. Activated carbon refers to any predominantly carbon-based material that exhibits a surface area greater than about 100 m²/g, for example, about 100 m²/g to about 2500 m²/g, as measured using conventional single-point BET techniques (for example, using equipment by Micromeritics FlowSorb III 2305/2310). In certain embodiments, the active material may comprise activated carbon, lead, and conductive carbon. For example, the active material may comprise 5-95 wt. % activated carbon; 95-5 wt. % lead; and 5-20 wt. % conductive carbon.

The active material 24 may be in the form of a sheet that is adhered to and in electrical contact with the corrosion-resistant conductive coating material 23. In order for the activated carbon to the adhered to and be in electrical contact with the corrosion-resistant conductive coating, activated carbon particles may be mixed with a suitable binder substance such as PTFE or ultra high molecular weight polyethylene (e.g., having a molecular weight numbering in the millions, usually between about 2 and about 6 million). In embodiments, the amount of binder may be about 3 to about 25 wt. %, preferably about 5 to about 15 wt. % (for example, 10 wt. %), based upon the weight of the active material and binder. The binder material preferably does not exhibit thermoplastic properties or exhibits minimal thermoplastic properties.

The activated carbon and PTFE or ultra high molecular weight polyethylene binder reduce the pressure required to establish good electrical conductivity between the active material and the corrosion-resistant conductive coating to less than about 5 psi, preferably less than about 3 psi. In contrast, the use of polyethylene or polypropylene binders or a slurry-coated electrode with acrylic or butadiene binders require greater than 5 psi to obtain good contact between an active material and a corrosion-resistant conductive coating.

A tab portion 30 extends from a side of the negative electrode, for example, for the current collector 22. In embodiments, the tab portion 30 is an extension of the current collector.

A lug 32 comprising lead or lead alloy is cast onto and encapsulates at least part, preferably all, of tab portion 30. The lug 32 may be applied before the acid-resistant coating 23 and active material 24 are secured to the current collector 22, thereby limiting the exposure of these materials to high temperatures need to melt lead. Applying the lug 32 before the corrosion-resistant conductive coating 23 and active material 24, also allows hot melt glue 41 to be applied right up to the lug 32 when securing the corrosion-resistant conductive coating and the active material.

In embodiments, the lug 32 may have a thickness of about 0.5 mm to about 10 mm. The thickness of the lug 32 is chosen to ensure that the seal to the tab portion 30 and corrosion-resistant coating 23 is not affected by the thermal processing that occurs during a cast-on-strap (COS) operation.

The lug 32 ensures that the current collector 22 does not corrode from an electrolyte. In certain embodiments, the lead in the lug will react with a sulfuric acid electrolyte to form $PbSO_4$, forming a barrier to corrosion. Based upon accelerated testing, the lug provides for about 5 years to about 10 years of protection from corrosion of the current collector. In contrast, use of a plastic sleeve to protect a tab portion and the current collector fails readily, as the acidic electrolyte quickly penetrates between the plastic and the tab portion.

According to the present invention, a cast-on strap (COS) 38 is cast onto lug 32. Preferably, the cast-on strap 38 comprises lead or a lead alloy. The cast-on strap may be cast onto lug 32 using a conventional cast-on machine which employs molten lead in the first instance. Cast-on strap 38 is preferably a unitary, one-piece part.

B. Positive Electrode

Figure 3:
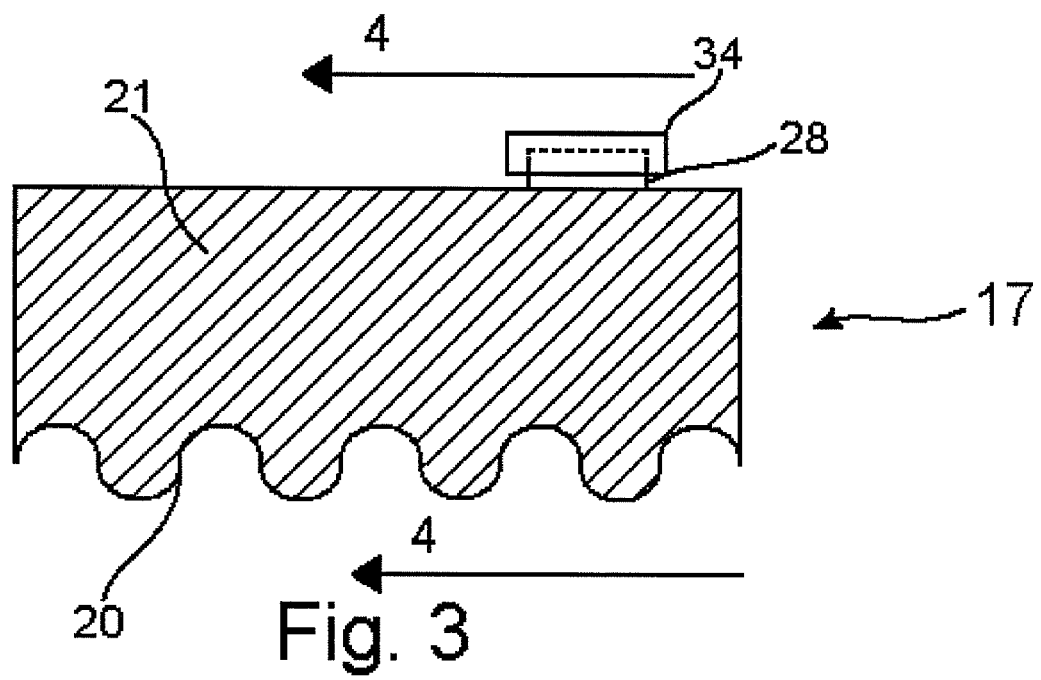
FIG. 3 is a partial schematic view of a positive electrode having a cast-on strap according to an embodiment of the present invention.
Figure 4:
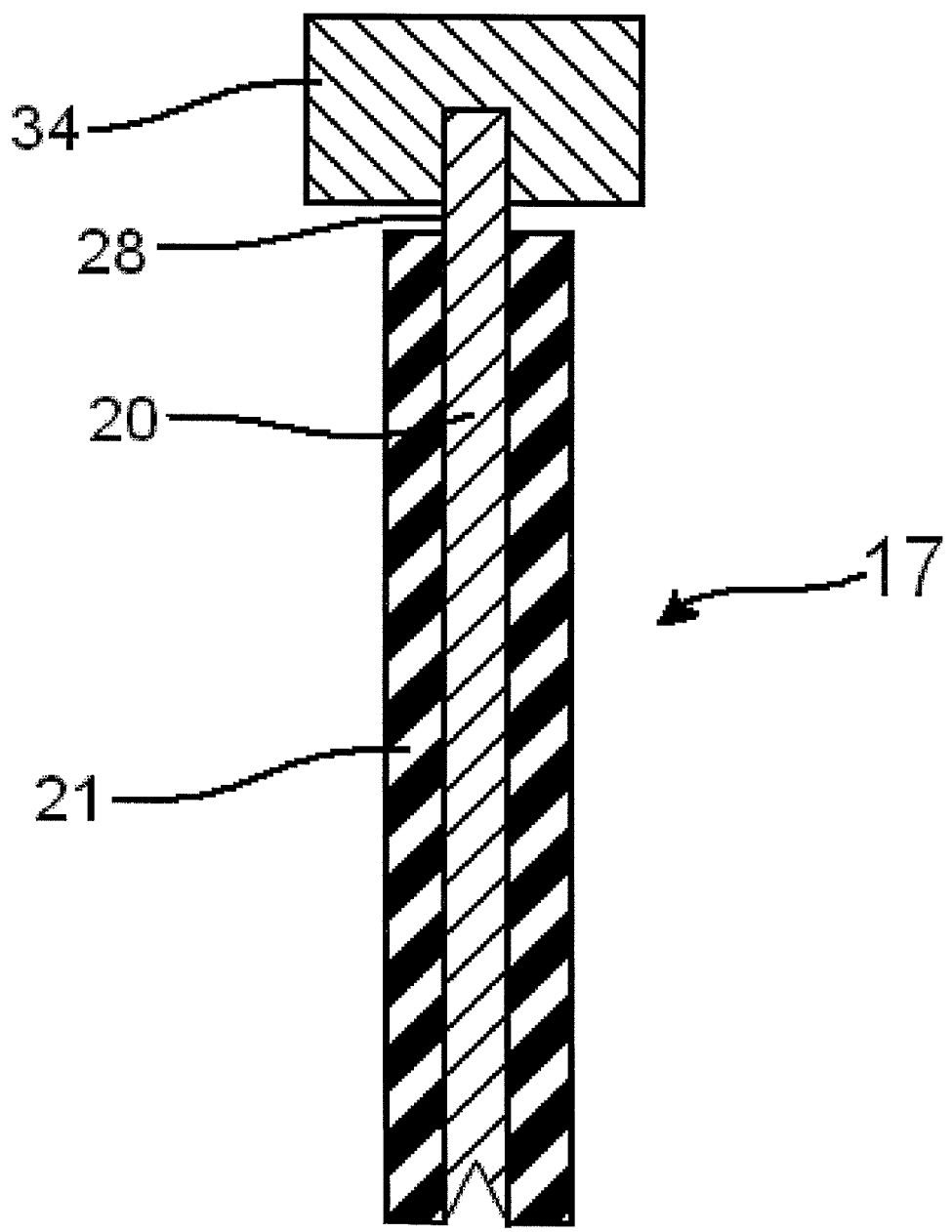
FIG. 4 is a cross-section of the positive electrode of FIG. 3.

FIG. 3 and FIG. 4 illustrate at least one positive electrode 17. The positive electrode comprises a current collector 20 comprising lead. In embodiments, the current collector may be in the form of a plate or grid. A lead-based active material 21, such as lead dioxide, is applied on at least one face of current collector 20. In embodiments, the lead dioxide may be a paste applied to a lead grid. The positive electrode also comprises tab portion 28 that extends from a side of the at least one positive electrode 17, for example, extending above current collector 20. In embodiments, the tab portion 28 is an extension of the current collector. In certain embodiments, a lug comprising lead or lead alloy may be cast onto and encapsulate at least part or all of the tab portion.

According to the present invention, a cast-on strap (COS) 34 is cast onto tab 28 for the at least one positive electrode. Preferably, cast-on strap 34 comprises lead or a lead alloy. The cast-on strap may be cast onto the tab 28 using a conventional cast-on machine which employs molten lead in the first instance. Cast-on strap 34 is preferably a unitary, one-piece part.

C. Hybrid Energy Storage Device

Figure 5:
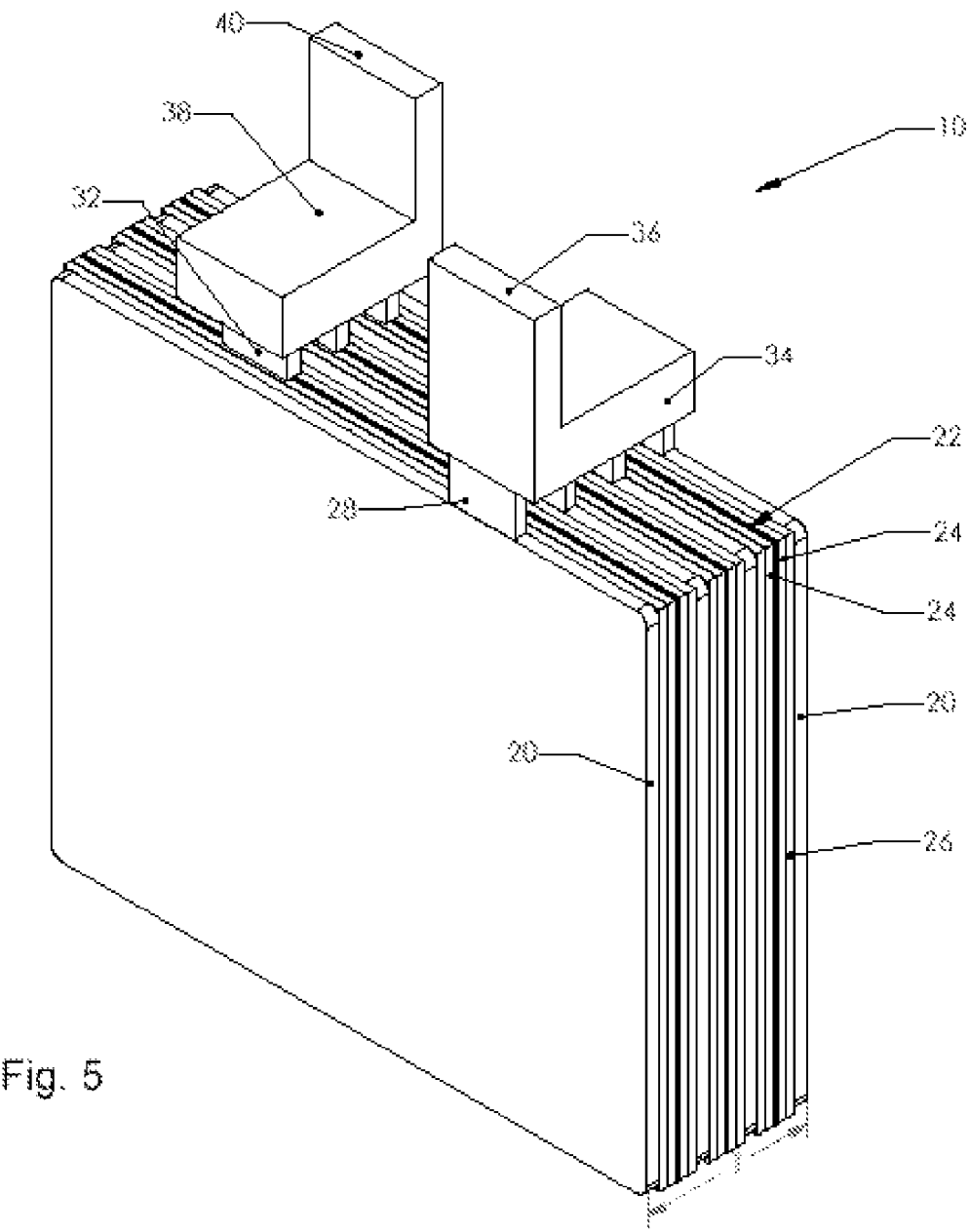
FIG. 5 is a perspective view of a cell according to the present invention.

FIG. 5 illustrates a single cell 10 according to an embodiment of the present invention. A cell may comprise any number of positive electrodes and negative electrodes, for example, (1) n negative electrodes and n+1 positive electrodes or (2) n+1 negative electrodes and n positive electrodes. In FIG. 5, cell 10 comprises four positive electrodes and three negative electrodes in alternating order. Each negative electrode comprises a current collector 22 having a corrosion-resistant coating (not shown) adhered to each face thereof, and an activated carbon material 24 adhered to and in electrical contact with the corrosion-resistant coating on each face thereof.

Between each adjacent positive electrode and negative electrode comprising active material 24, there is placed a separator 26. Separator 26 comprises a material suitable for use with an acid electrolyte, and may comprise a woven material or a felted material. The separator may comprise an absorbent glass mat (AGM) or polyethylene.

Each of the positive electrodes comprises a tab 28 extending above a top edge of the electrode. Each negative electrode comprises a tab 30 extending above a top edge of the electrode. According to the present invention, the positive electrode tabs 28 are electrically secured one to another by a cast-on strap 34, which may have a connector structure 36. Likewise, the negative electrode tabs 30 are electrically secured one to another by a cast-on strap 38, which may have a connector structure 40.

The hybrid electric storage device according to the present invention may have a housing, such as a case used for valve-regulated lead-acid (VRLA) batteries. According to the present invention, the crosswise dimension of each cell compartment of a housing or case is referred to as the void width. To apply a slight compression to each cell, and thereby assure appropriate physical and electrical contact between the separators and the respective positive and negative electrodes, the aggregate thickness T of an assembled cell 10 as shown in FIG. 5 is greater than the void width of the cell compartment of the case. The difference between the aggregate thickness T and the void width is usually in the order of about 0.01 T to about 0.2 T. This difference results in a compression which is typically in the range of about 0.2 to about 5 psi, preferably in the range of about 1 to about 3 psi. The compression is in a direction through the thickness of each cell. The compression of each cell reduces problems such as cell damage due to vibration.

Once each cell 10 is placed into its respective compartment in the case, then a cover for the case is sealed in any conventional manner, and a predetermined quantity of the acid electrolyte is added to each compartment. In preferred embodiments, the acid electrolyte is sulfuric acid.

The negative and positive cast-on straps 34, 38 provide connections which can be made to similar electrodes within the same cell, or to electrodes in an adjacent cell, using conventional lead-acid battery assembly equipment, such as valve-regulated lead-acid (VRLA) equipment.

Positive and negative connection terminals for the hybrid energy storage device are provided by making appropriate connections between the negative and positive cast-on straps 34, 38 of one or more cells. According to the present invention, a series connection may be made in which the voltage of the hybrid energy storage device is the accumulative voltage of the respective cells. Alternatively, it may be desired to provide parallel-connected cells by electrically joining together all the positive cast-on straps 34 to all the negative cast-on straps 38 of one or more cells in a hybrid energy storage device.

The assembly of a cell such as that which is shown in FIG. 5 may be carried out using conventional lead acid battery assembly equipment of the sort used for assembly of VRLA automotive batteries, with relatively insignificant and inexpensive modifications that may be required to handle the negative electrode component. Principally, the stacking machines must be adapted so as to be able to handle negative electrodes in keeping with the teachings hereof.

The present invention is also directed to a method of manufacture of a hybrid lead-carbon energy storage device. The method comprises stacking the at least one positive electrode, at least one negative electrode, and a separator therebetween for at least one cell. The at least one cell is placed in a conventional cast-on machine, such as that used in the manufacture of conventional lead acid batteries (e.g., Dynamac® COS machine manufactured by MAC Engineering). Straps of molten lead or lead alloy are cast onto tabs/lugs of the at least one negative electrode and onto tabs of the at least one positive electrode and subsequently cooled to form a solid and one-piece lead connection between the respective tabs. The cast-on stacked cell(s) are placed into respective cell compartments of a case. Cell-to-cell connections are made between the cast-on straps of adjacent cells, as required for series or parallel connection of the cells.

VI. INDUSTRIAL APPLICABILITY

A hybrid energy storage device is provided. The hybrid energy storage device is particularly suitable for automotive industry, motive power, stationary, and other energy storage applications.

Although specific embodiments of the invention have been described herein, it is understood by those skilled in the art that many other modifications and embodiments of the invention will come to mind to which the invention pertains, having benefit of the teaching presented in the foregoing description and associated drawings.

It is therefore understood that the invention is not limited to the specific embodiments disclosed herein, and that many modifications and other embodiments of the invention are intended to be included within the scope of the invention. Moreover, although specific terms are employed herein, they are used only in generic and descriptive sense, and not for the purposes of limiting the description invention.

What is claimed is:

1. A hybrid energy storage device, comprising:
   at least one cell comprising at least one positive electrode, at least one negative electrode, a separator placed between said at least one positive and said at least one negative electrode, and an electrolyte;

said at least one positive electrode comprising an active material comprising lead and a tab extending from a side of the at least one positive electrode;

said at least one negative electrode comprising an activated carbon material, a tab extending from a side of the at least one negative electrode, and a lead lug encapsulating said tab;

a first cast-on lead strap being on the tab extending from said at least one positive electrode;

a second cast-on lead strap being on the lead lug of the at least one negative electrode.

2. The hybrid energy storage device of claim 1, wherein the first cast-on strap and second cast-on strap comprise lead or a lead alloy.

3. The hybrid energy storage device of claim 1, wherein the first cast-on strap and the second cast-on strap are each unitary, one-piece parts.

4. The hybrid energy storage device of claim 1, wherein said at least one negative electrode further comprises:
a current collector;
a corrosion-resistant coating adhered to at least one face of the current collector; and
an activated carbon material adhered to and in electrical contact with the corrosion-resistant coating.

5. The hybrid energy storage device of claim 1, wherein said electrolyte comprises sulfuric acid.

6. The hybrid energy storage device of claim 4, wherein said corrosion-resistant conductive coating comprises an expanded graphite sheet or foil.

7. The hybrid energy storage device of claim 1, wherein said at least one negative electrode comprises activated carbon and lead.

8. The hybrid energy storage device of claim 4, wherein the current collector comprises copper or a copper alloy.

9. The hybrid storage device of claim 4, wherein the current collector comprises a material having a conductivity greater than $1.0 \times 10^5$ siemens/m.

10. The hybrid energy storage device of claim 1, wherein said at least one positive electrode comprises lead dioxide.

11. The hybrid energy storage device of claim 1, wherein said at least one positive electrode further comprises a current collector comprising lead.

12. The hybrid energy storage device of claim 1, wherein the at least one cell comprises a plurality of positive electrodes and a plurality of negative electrodes.

13. The hybrid energy storage device of claim 1, wherein the at least one cell comprises n+1 positive electrodes and n negative electrodes arranged in an alternating manner with the separator between each positive electrode and negative electrode.

14. The hybrid energy storage device of claim 1, wherein the at least one cell comprises n positive electrodes and n+1 negative electrodes arranged in an alternating manner with the separator between each positive electrode and negative electrode.

15. The hybrid energy storage device of claim 1, comprising a plurality of cells.

16. The hybrid energy storage device of claim 1, further comprising a case for said at least one cell.

17. The hybrid energy storage device of claim 16, wherein an aggregate thickness of said at least one cell is greater than a void width of said case.

18. The hybrid energy storage device of claim 16, wherein an aggregate thickness of said at least one cell is greater than a void width of said case by about 0.01 T to 0.2 T.

19. The hybrid energy storage device of claim 1, wherein a compression pressure in a direction through the thickness of said at least one cell of is about 0.2 psi to about 5 psi.

20. A method of manufacture of the hybrid energy storage device according to claim 1, comprising:
stacking at least one negative electrode, at least one positive electrode, and the separator therebetween to form at least one cell;
casting a first cast-on strap onto the tab of said at least one positive electrode;
casting a second cast-on strap onto the lead lug of said at least one negative electrode; and
placing the at least one cell into a case.

21. A method according to claim 20, wherein an aggregate thickness of said at least one cell is greater than a void width of said case, thereby causing a compression pressure of about 0.2 to 5 psi in a direction through the thickness of said at least one cell when placed into the case.

22. A method according to claim 20, further comprising:
placing a plurality of cells into the case; and
making a series connection between said cells by connecting respective cast-on straps of said at least one positive electrode and respective cast-on straps of said at least one negative electrode.

23. A method according to claim 20, further comprising:
placing a plurality of cells into the case; and
making a parallel connection between said cells by connecting cast-on straps of said at least one positive electrode to cast-on straps of said at least one negative electrode.

* * * * *